United States Patent Office 2,874,136
Patented Feb. 17, 1959

2,874,136

POLYVINYL METHYL ETHER COMPOSITION AND METHOD FOR IMPROVING CROCK FASTNESS OF COLORED TEXTILES

Carl A. Bergman, Charlotte, N. C., assignor to General Aniline & Film Corporation, New York, N. Y., a corporation of Delaware No Drawing. Application September 10, 1956
Serial No. 608,701

8 Claims. (Cl. 260—28.5)

This invention relates to a novel process for improving the crock fastness of dyestuffs, and other textile coloring material, such as pigment-resin printing, and the like; and a novel composition of matter, useful for improving the crock fastness of dyed and otherwise colored textile and related materials.

I have found that certain water-soluble or water-dispersible organic polymeric materials, i. e., polyvinyl methyl ether, polyvinyl alcohol, and water-dispersible polyamides, of the nylon type, when applied as a finish to dyed or otherwise colored textiles, have the property of substantially improving the crock fastness of the textile.

In particular, I have found that polyvinyl methyl ether, by itself, effects a marked improvement in the wet crock fastness of the dyeing, but only a slight improvement in the dry crock fastness. It has been found, however, that by incorporating a small amount of a lubricant, such as permanent or nonpermanent water repellent finishes for textiles, or oil softening agents for textiles, along with the polyvinyl methyl ether, a further improvement in the wet crock fastness is effected, frequently, almost eliminating crocking, and very marked improvements in the dry crocking properties are effected.

A possible explanation of this effect appears to be that with polyvinyl methyl ether alone, in the wet crock fastness test, the water acts as a lubricant, so that the improvement effected by the polyvinyl methyl ether is clearly evident in the wet test. However, since polyvinyl methyl ether tends to be a tackifier, surface frictional properties are increased in the dry test, and for improvement in this test, the presence of a lubricant appears to be necessary. It is rather surprising that a lubricant, combined with polyvinyl methyl ether, effects marked improvement in both wet and dry crock fastness, since a lubricant, by itself, has an adverse effect on the crock fastness.

I have also found that other water-soluble, or water-dispersible organic polymeric materials, i. e., polyvinyl alcohol, and water-dispersible polyamide-(nylon) type polymers also possess the property of, themselves, improving wet crock fastness; and, when combined with a lubricant to improve the dry crock fastness. However, in most applications, polyvinyl methyl ether is preferred for use in the novel products of the present invention, and for practicing the process thereof, since either alone, or combined with a lubricant, it does not effect the hand or drape of the goods, and it can be formulated to be compatible with a wide variety of finishes used on textiles. Specifically, it is compatible with resin finishes, such as those used in everglaze and shrinkage control, and with durable water repellant finishes. It can also be used with starch finishes, which can be applied hot. In which case, due to the fact that the water-solubility of the polyvinyl methyl ether decreases as the temperature of the water is increased, it is necessary to use an emulsifier to disperse the polyvinyl methyl ether. Suitable emulsifiers are higher di-esters, such as the higher di-alkyl of sodium sulfo-succinic acid; e. g., di-octyl sodium sulfo-succinic acid, diheptyl sulfo-succinic acid, di-2-methylhexyl sulfo-succinic acid, etc., and the higher alkyl ($C_8$–18) dimethyl-benzoylammonium chlorides, the latter quaternary emulsifiers being particularly desirable, since they may also function as lubricants.

While, as stated above, either polyvinyl alcohol, of dispersible polyamide (nylon)-type polymeric products may be used, in place of the polyvinyl methyl ether, it has been found that these two latter materials, while they effect an improvement in crock fastness, similar to that when using polyvinyl methyl ether, also have a decided stiffening effect on the goods, in some cases imparting to them an objectionably boardy "hand"; and, therefore these materials, polyvinyl alcohol and polyamides, are desirable for use only when it is desired to impart a firm hand to the goods, as well as to improve crock properties.

In the case of pigment dyeing and printing, the process and product of the present invention has been found also to improve the wash fastness of the material. This same effect, improvement in wash fastness, is, sometimes, obtainable with a urea or melamine resin treatment. However, when urea or other resin treatments improve the wash fastness of pigment dyeings and printings, they do not effect any substantial improvement in crock fastness, unless the novel products of the present invention have been incorporated therein.

EXAMPLE I

Corduroy, dyed with a red naphthol combination and properly soaped and which had a marked tendency to crock, was finished by padding at 80° F., in a solution containing 5% polyvinyl methyl ether (50% aqueous), and, as a lubricant, 3% of a non-durable, water-repellant composition, in the form of an emulsion having a solids content of 25% and containing about 18% of a paraffin wax with a melting point of 122–126° F., and an ammonium oleate emulsifier, and about 10% of aluminum acetate. The pick-up was about 75%, and the goods were dried on cans and tenter frames. No curing was necessary. Wet and dry crock fastness was markedly improved, over the original dyed and soaped goods.

Samples of mill-dyed corduroy, dyed with an (1) Orange naphthol shade combination;
(2) Sulfur green shade combination;
(3) Sulfur blue shade combination;
(4) Two sulfur gray shade combinations;
(5) Medium sulfur green shade combination, all having poor wet and dry crock fastness, were treated in the same manner, as above; i. e., were finished by padding at 80° F., in a solution containing 5% polyvinyl methyl ether (50% aqueous), and 3% of the same non-permanent water repellant paraffin wax emulsion-aluminum oleate composition. The pick-up was about 75%, and the goods were dried on cans and tenter frames. No curing was necessary. Wet and dry crock fastness was markedly improved, over the original dyed and soaped goods.

EXAMPLE II

In place of the formulation given in Example I, I repeated these tests, using a 5% solution of polyvinyl methyl ether (50% aqueous), and 1% stearic acid amide of hydroxyethyl ethylenediamine reacted with 1 hole of chloracetic acid, mixed with 10% by weight of eicosane wax (a $C_{20}$ paraffin wax cut). This latter product is a textile softener, and served as the lubricant. This was padded at 80° F. and dried on shades used in Example I. Again, wet and dry crock fastness was markedly improved over the original dyed and soaped goods.

EXAMPLE III

This illustrates the application of the present invention to finishing pigment printed fabrics. Samples of pigment printed fabric, comprising fourteen patterns, which had been done in a commercial mill by the Aridye process, were finished by padding at 70° F., through a solution containing 5% polyvinyl methyl ether (50% aqueous) and 3% of the same non-permanent water repellant paraffin wax emulsion-aluminum oleate composition, used in Example 1, above, followed by drying on cans and tenter frames. There was a marked improvement in the wet and dried crock fastness in all samples, which included samples of pigments, vats and azoics. There was no adverse effect on the hand of any of these fabrics.

EXAMPLE IV

A finish containing 5% polyvinyl methyl ether (50% aqueous) and 3% of the above non-permanent water repellant paraffin wax emulsion-aluminum acetate composition used in Example 1 was applied in resin baths containing 60% paste methylol urea resin monomer and methylated trimethylol melamine (80% active), and I obtained marked improvement in the crock fastness. Furthermore, these materials were compatible in this resin system.

The composition of the baths used were (per gallon):

*Resin bath alone used as control in test*

9.6 oz. of 60% paste, methylol urea resin monomer (ratio HCHO to urea 1.3:1)
11.2 oz. methylated, trimethylolmelamine (80% active)
0.8 oz., a mixture of 85% diammonium phosphate and 15% urea as an accelerator

BATH 1

9.6 oz. of 60% paste, methylol urea resin monomer, (ratio HCHO to urea 1.3:1)
11.2 oz. of methylated trimethylol melamine (80% active)
0.8 oz. of a mixture of 85% diammonium phosphate and 15% urea as an accelerator
5 oz. of polyvinyl methyl ether (50% aqueous)
2½ oz. of the same non-permanent water repellant paraffin wax emulsion-aluminum acetate composition used in Example 1.

BATH 2

9.6 oz., 60% paste, methylol urea resin monomer (ratio HCHO to urea 1.3:1)
11.2 oz. of methylated, trimethylol melamine (80% active)
0.8 oz. of a mixture of 85% diammonium phosphate and 15% urea as an accelerator
5.0 oz. of polyvinyl methyl ether (50% aqueous)
2.5 oz. of a mixture of stearic acid amide of hydroxy ethyl ethylenediamine reacted with 1 mole of chloracetic acid and 10% eicosane

BATH 3

9.6 oz. of 60% paste, methylol urea resin monomer (ratio HCHO to urea 1.3:1)
11.2 oz. methylated, trimethylol melamine (80% active)
0.8 oz., a mixture of 85% diammonium phosphate and 15% urea as an accelerator
5.9 oz. polyvinyl methyl ether (50% aqueous)

These resin finishes were applied to a number of mill dyed cotton fabrics, having poor crock fastness, by padding, dried and cured at 300° F. for 3 minutes. Improvement in crock is noted whether the resin-treated goods are washed or unwashed.

EXAMPLE V

The combination of 5% polyvinyl methyl ether (50% aqueous) and 3% the same non-permanent water repellant composition used in Example I, was applied in a hot starch finish bath, using the following formula (per gallon):

5 oz. of polyvinyl methyl ether (50% aqueous)
2½ oz. of non-permanent water repellant composition
2.7 oz. of starch
1.3 oz. diisobutyl carbinol di-ester of sulfosuccinic acid-sodium salt This was padded at 140° F. on samples of mill dyed cotton fabrics, having poor crock fastness, and dried, with no curing required. There was marked improvement in the wet dried crock fastness. Also, the diisobutyl carbinol diester of sulfosuccinic acid (sodium salt) served as an emulsifier for dispersing the polyvinyl methyl, as was required when polyvinyl methyl ether is used above 90° F., due to the fact that this polymer loses water solubility above this temperature.

In another set of tests, applying 5% polyvinyl methyl ether (50% aqueous) and 3% the non-permanent water repellant paraffin wax emulsion-aluminum oleate composition, or stearic acid amide of hydroxyethyl ethylenediamine reaction product with chloracetic acid and containing 10% eicosane, to fabric in a pad at 80° F. and drying, improvement in crock was obtained, and, also, excellent sewability properties of the fabric were obtained. By conventional seam sewing tests, used along with tensile-strength tests, it showed 90 to 100% strength retention properties at the seam.

EXAMPLE VI

In order to illustrate the use of other lubricant compositions, and other resins, practiced in the present invention, aqueous baths, of the materials shown below, were prepared, containing an amount of materials indicated by weight:

| | Percent, solids in bath |
|---|---|
| A. Polyvinylmethyl ether | 2 |
| Morpholine oleate emulsion of polyethylene | 0.5 |
| B. Polyvinylmethyl ether | 2 |
| Sulfated caster oil, 48% free fat | 0.5 |
| C. Polyvinylmethyl ether | 2 |
| Paraffin wax (M. P. 120–175° F.) | 0.5 |
| D. Polyvinylmethyl ether | 2.0 |
| Paraffin wax emulsion-aluminum acetate composition (non-durable water repellant product used in Example I, consisting of ammonium oleate emulsion of paraffin wax (M. P. 120–125° F.) containing aluminum acetate) | 0.25 |
| E. Polyvinyl alcohol | 2.0 |
| Paraffin wax emulsion-aluminum acetate composition | 0.5 |
| F. Polyvinyl alcohol | 4.0 |
| Paraffin wax emulsion-aluminum acetate composition | 0.5 |
| G. Polyvinyl alcohol | 2.0 |
| Morpholine oleate emulsion of polyethylene | 0.5 |
| H. Polyvinyl alcohol | 4.0 |
| Morpholine oleate emulsion of polyethylene | 0.5 |
| I. Triethanol amine salt of vinylmethyl ether-maleic anhydride copolymer | 4.0 |
| Morpholine oleate emulsion of polyethylene | 0.5 |
| J. Triethanol amine salt of vinylmethyl ether-maleic anhydride copolymer | 2.0 |
| Morpholine oleate emulsion of polyethylene | 0.5 |
| K. Dispersion of hexamethylene diamine-sebacic acid polyamide | 2.0 |
| Morpholine oleate emulsion of polyethylene | 0.5 |
| L. Dispersion of hexamethylene diamine-sebacic acid polyamide | 4.0 |
| Morpholine oleate emulsion of polyethylene | 0.5 |

Each of the baths were then applied to six fabrics, by padding the baths on the fabrics, at room temperature, and drying on a mangle at 220° to 250° F. Wet and dry crock tests were then made on the finished fabrics, in accordance with the AATTC test method, using the standard crock meter. In these tests, the following six fabrics, which were commercially dyed materials, were used with each bath:

1. Pigment green print on muslin
2. Pigment yellow print on muslin
3. Indo carbon black
4. Naphthol red on corduroy
5. Naphthol maroon on corduroy
6. Naphthol maroon on drapery Each of the fabrics used in the test showed substantial crocking in both the wet and dry crock test, before treatment; and substantial improvement in both wet and dry crock fastness was noted in each of the treated fabrics. It was noted that those fabrics treated with the baths, which contain polyvinylmethyl ether, were unaffected in hand, or drape. However, those fabrics treated with the baths containing polyvinyl alcohol, or the poly amide dispersion, were appreciably stiffened, so that these latter baths, while they improve the crock fastness of the dyeing, are suitable for use only where a firm hand is desired in finished goods.

The polyvinyl methyl ether, used in preparing certain of the above baths, as well as in the preceding examples, was a light yellow balsam-like liquid, with a specific gravity ($D^{25}_4$) of 1.05, and a viscosity (NSP) in the range of 0.5 to 0.9 (1 gram per 100 ml. benzene at 25° C.), and a refracted index ($N^{25}_D$) of 1.47. The morpholine oleate emulsion of polyethylene, used in certain of the foregoing baths, wes prepared as follows: A white, wax-like polyethylene, having a molecular weight in the range of 4,000 to 6,000, and a melting point in the range of 208 to 214° F., was used. 30 parts of this polyethylene, and 6 parts by weight oleic acid were mixed and melted at a temperature of 120–130° C., and 6 parts by weight of morpholine, added thereto. The molten mixture was then poured into 138 parts of water, which had been heated just to boiling, while stirring rapidly, but below the speed at which air would be whipped in; and the thus prepared emulsion allowed to cool, while stirring moderately.

The dispersion of hexamethylene diamine-sebacic poly amide employed was a commercial dispersion of this nylon resin in water, having 10% solids content, a pH of 6.8 to 7.2 an average particle size of 2 microns minimum and 5 microns, maximum particle size. The polyvinyl alcohol employed in certain of the above baths was a high viscosity, fully hydrolyzed polyvinyl alcohol, i. e., viscosity of 4%, aqueous solution at 20° C., 55–65 cps., percent hydrolysis 99 to 100°, pH=6 to 8, volatiles 5% maximum, ash 1% maximum.

From a consideration of the foregoing examples, it will be apparent that the resin component of the composition of the present invention is the major component thereof; and the lubricant, the minor component of the composition. The lubrication should comprise at least 10% of the total composition, on a 100% solids basis, and, preferably, about 8 to 3 parts of resin are used, per part of lubricant. However, when treating fabrics having a resin finish, or those colored by a pigment resin process, since the fabric already contains some resin, the amount of lubricant in the composition of the present invention, used to improve crock fastness, may be increased, until about equal parts of resin and lubricant are present in the composition.

I claim:

1. A composition for treating colored textile materials having a tendency to crock which consists essentially of (A) a major amount of polyvinyl methyl ether and (B) a minor amount of a water dispersible textile lubricant selected from the group consisting of (1) a higher fatty acid amide of hydroxy ethyl ethylenediamine reacted with chloracetic acid, (2) an emulsifiable paraffin wax and (3) an emulsifiable polyethylene wax having a molecular weight below about 6,000.

2. A composition as defined in claim 1 wherein the water dispersible textile lubricant specified is an emulsifiable paraffin wax consisting essentially of a mixture of paraffin wax and an emulsifier therefor.

3. A composition as defined in claim 1 wherein the water dispersible textile lubricant specified is an emulsifiable polyethylene wax consisting essentially of a mixture of wax like polyethylene having a molecular weight below about 6,000 and an emulsifier therefor.

4. A composition as defined in claim 1, wherein the water dispersible textile lubricant specified is a higher fatty acid amide of hydroxyethyl ethylene diamine, reacted with chloracetic acid.

5. The method of improving the crock fastness of colored textiles, having tendency to crock, which comprises impregnating such textile with an aqueous bath containing a small amount of the composition defined in claim 1 and heating and drying the thus treated textile.

6. The method of improving the crock fastness of colored textiles having tendency to crock, which comprises impregnating such textile with an aqueous bath containing a small amount of the composition defined in claim 2, and heating and drying the thus treated textile.

7. The method of improving the crock fastness of colored textiles having tendency to crock, which comprises impregnating such textile with an aqueous bath, containing a small amount of the composition defined in claim 3, and heating and drying the thus treated textile.

8. The method of improving the crock fastness of colored textiles having a tendency to crock which comprises impregnating such textile with an aqueous bath containing a small amount of the composition defined in claim 4 and heating and drying the thus treated textile.

References Cited in the file of this patent

UNITED STATES PATENTS

| | | |
|---|---|---|
| 2,277,788 | Shipp et al. | Mar. 31, 1942 |
| 2,284,100 | Meigs | May 26, 1942 |

UNITED STATES PATENT OFFICE

CERTIFICATE OF CORRECTION

Patent No. 2,874,136        February 17, 1959

Carl A. Bergman

It is hereby certified that error appears in the printed specification of the above numbered patent requiring correction and that the said Letters Patent should read as corrected below.

Column 2, line 65, for "hole" read -- mole --; column 5, line 57, for "lubrication" read -- lubricant --.

Signed and sealed this 18th day of October 1960.

(SEAL)
Attest:

KARL H. AXLINE
Attesting Officer

ROBERT C. WATSON
Commissioner of Patents